United States Patent [19]
Sapir et al.

[11] Patent Number: 5,699,516
[45] Date of Patent: Dec. 16, 1997

[54] METHOD AND APPARATUS FOR IMPLEMENTING A IN-ORDER TERMINATION BUS PROTOCOL WITHIN A DATA PROCESSING SYSTEM

[75] Inventors: Adi Sapir, Tel Aviv, Israel; James B. Eifert, Austin, Tex.

[73] Assignee: Motorola, Inc., Schaumburg, Ill.

[21] Appl. No.: 363,435

[22] Filed: Dec. 22, 1994

[51] Int. Cl.[6] .................................................... G06F 13/36
[52] U.S. Cl. ...................... 395/200.01; 395/287; 395/290
[58] Field of Search .............................. 395/220, 200.03, 395/200.05, 775, 287, 290, 293, 200.01

[56] References Cited

U.S. PATENT DOCUMENTS

| | | | |
|---|---|---|---|
| 5,050,066 | 9/1991 | Myers et al. | 395/182.16 |
| 5,191,649 | 3/1993 | Cadambi et al. | 395/200.05 |
| 5,255,373 | 10/1993 | Brockmann et al. | 395/325 |
| 5,345,562 | 9/1994 | Chen | 395/290 |
| 5,345,578 | 9/1994 | Manasse | 395/473 |
| 5,513,327 | 4/1996 | Farmwald | 395/309 |
| 5,546,546 | 8/1996 | Bell et al. | 395/292 |
| 5,588,125 | 12/1996 | Bennett | 395/306 |

*Primary Examiner*—Mehmet B. Geckil

[57] ABSTRACT

A bus protocol is provided for pipelined and/or split transaction buses (18,48) which have in-order data bus termination and which do not require data bus arbitration. The present invention solves the problem of matching the initial address request by a bus master (12, 13, 42) to the corresponding data response from a bus slave (14, 15, 44) when the bus (18, 48) used for master-slave communication is a split-transaction bus and/or a pipelined bus. Each bus master (12, 13, 42) and each bus slave (14, 15, 44) has a counter (30–33, 75–76) which is used to store a current pipe depth value (21, 51) from a central pipe counter (16, 72). A transaction start signal (20, 50) and a transaction end signal (22, 52) are used to selectively increment and decrement the counters (30–33, 75–76).

15 Claims, 6 Drawing Sheets

PIPE DEPTH FOR STARTING BUS CYCLES

| PREVIOUS PIPE DEPTH | TRANSFER START 50 (PREVIOUS T3) AND ADDRESS ACKNOWLEDGE 55 AND ABORT 56 | TRANSFER ACKNOWLEDGE (ON T2) | NEXT PIPE DEPTH | START NEW CYCLE ON T3? |
|---|---|---|---|---|
| 0 | NO | X | 0 | YES |
| 0 | YES | ASSERTED | 0 | YES |
| 1 | NO | ASSERTED | 0 | YES |
| 0 | YES | NEGATED | 1 | YES |
| 1 | YES | ASSERTED | 1 | YES |
| 1 | NO | NEGATED | 1 | YES |
| 2 | NO | ASSERTED | 1 | YES |
| 1 | YES | NEGATED | 2 | NO |
| 2 | NO | NEGATED | 2 | NO |

FIG. 4

METHOD AND APPARATUS FOR IMPLEMENTING A IN-ORDER TERMINATION BUS PROTOCOL WITHIN A DATA PROCESSING SYSTEM

FIELD OF THE INVENTION

The present invention relates in general to a data processing system, and more particularly to a method and apparatus for implementing a bus protocol having in-order termination,

BACKGROUND OF THE INVENTION

Many data processing systems consist of one or more master devices, such as a processing unit, and one or more slave devices, such as memory devices, which the master devices need to access via a bus in order to read instructions and/or data. In order to read the instructions or data (hereinafter referred to as data), the master device generally transmits a request to the slave device indicating where in the device the data is to be found and the slave device acknowledges the request and then proceeds to transmit the requested data. Such a transaction may take a relatively long time to complete, particularly if the slave device happens to be a slow responding device.

In order to speed up processing time, systems have been known in which the master device or devices transmit requests to the slave device or devices without waiting for an answer, so that there may be a number of requests from one or more master devices outstanding and waiting for their corresponding answers to be received to complete the transaction. In these cases, the problem arises of the master device or devices matching the answers received on the bus from the slave device or devices, which answers may not be in the same order as the requests, with the corresponding requests. This matching of the initial request by a master to the corresponding response or answer from a slave is especially an problem when the bus used for master-slave communication is a split-transaction bus and/or a pipelined bus.

A split-transaction bus is a bus that allows different bus masters to have ownership of the address bus and data bus at the same time. As an example, when a split-transaction bus is used, microprocessor #1 can use the address bus at the same time that microprocessor #2 uses the data bus. In non-split-transaction buses, the same processor is the bus master of both the address bus and the data bus. Thus when non-split-transaction buses are used, ownership of the address bus and data bus cannot be split. Split-transaction buses are often used in multi-processor systems in order to increase the bandwidth of the buses.

A pipelined bus is a bus that allows the address phase of one transaction to overlap the data phase of another transaction. Many multi-processor buses combine split-transactions and pipelining in order to maximize information transfers on both the address bus and the data bus.

The present invention addresses the problem of matching the initial request by a master to the corresponding data response from a slave when the bus used for master-slave communication is a split-transaction bus and/or a pipelined bus.

BRIEF DESCRIPTION OF THE DRAWINGS

FIG. 4 illustrates, in tabular form, a behavior of data processing system 40 of FIG. 3 in accordance with one embodiment of the present invention;

DESCRIPTION OF THE PREFERRED EMBODIMENTS

In one embodiment, the present invention provides a method and apparatus for implementing a bus protocol having in-order data bus termination. The present invention solves the problem of matching the initial address request by a bus master to the corresponding data response from a slave when the bus used for master-slave communication is a split-transaction bus and/or a pipelined bus.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

DESCRIPTION OF THE FIGURES

Figure 1:
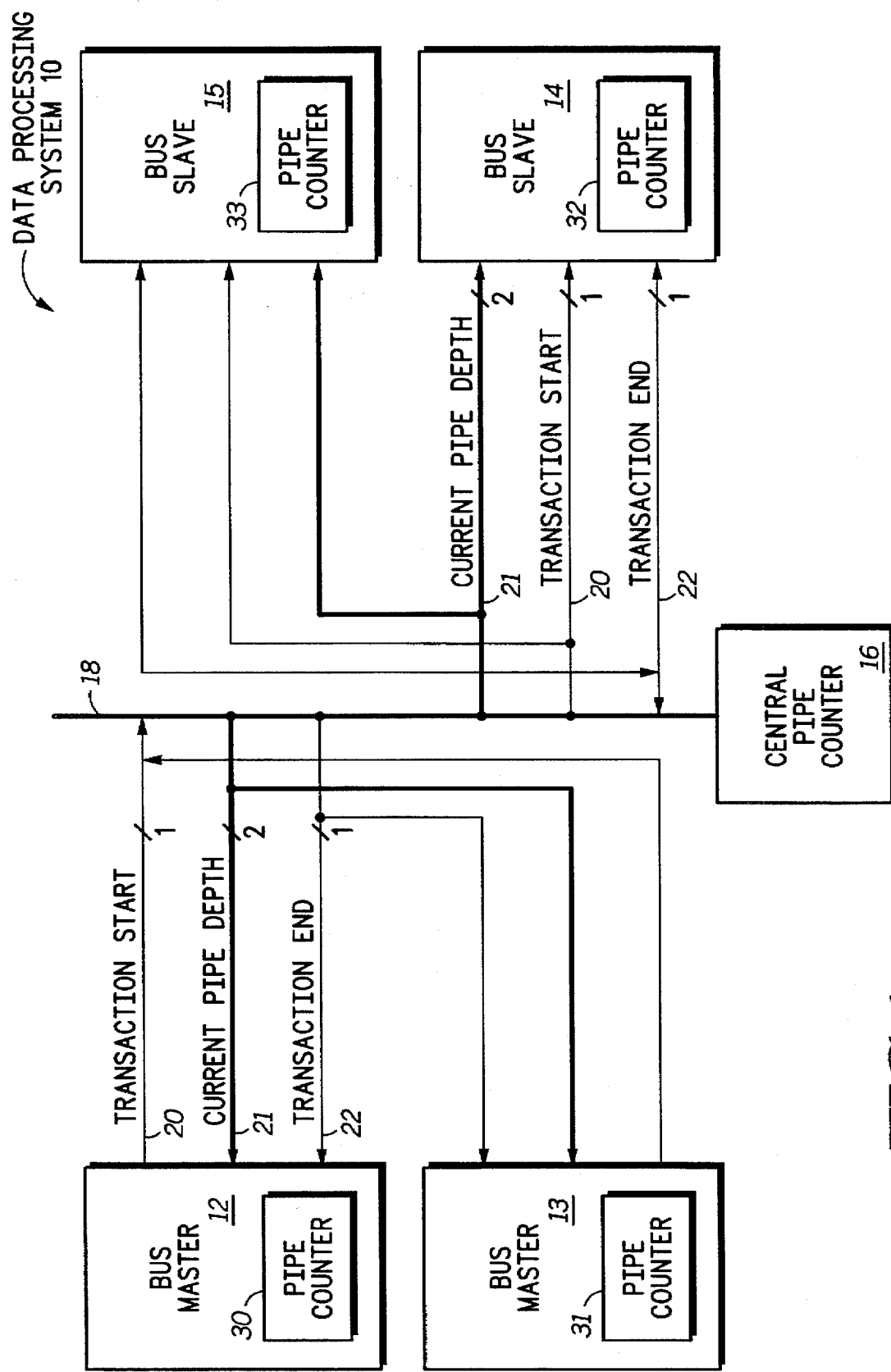
FIG. 1 illustrates, in block diagram form, a data processing system 10 in accordance with one embodiment of the present invention.

FIG. 1 illustrates a data processing system 10 that includes one or more bus master devices 12–13 and one or more bus slave devices 14–15 which are bi-directionally coupled by way of bus 18. Central pipe counter 16 is also coupled to bus 18.

Bus 18 includes a transaction start signal that is provided by bus masters 12–13 to bus slaves 14–15 and central pipe counter 16 by way of conductor 20. Bus 18 also includes a transaction end signal that is provided by one of bus slaves 14–15 to bus masters 12–13, to central pipe counter 16, and to the other of bus slaves 14–15 by way of conductor 22. And, bus 18 includes one or more current pipe depth signals 21 which are provided by central pipe counter 16 to bus master devices 12–13 and bus slave devices 14–15 by way of conductors 21. There are also other signals (not shown) which are included in bus 18, such as, for example, address signals, data signals, and various control signals.

Bus master 12 includes a pipe counter 30 for keeping track of the pipe depth; and likewise, bus master 13 includes a pipe counter 31 for keeping track of the pipe depth. Bus slave 14 includes a pipe counter 32 for keeping track of the pipe depth; and likewise bus slave 15 includes a pipe counter 33 for keeping track of the pipe depth. In one embodiment of the present invention, all of data processing system 10 is integrated on a same integrated circuit. In alternate embodiments of the present invention, various portions of data processing system 10 may be integrated on different integrated circuits.

Figure 2:
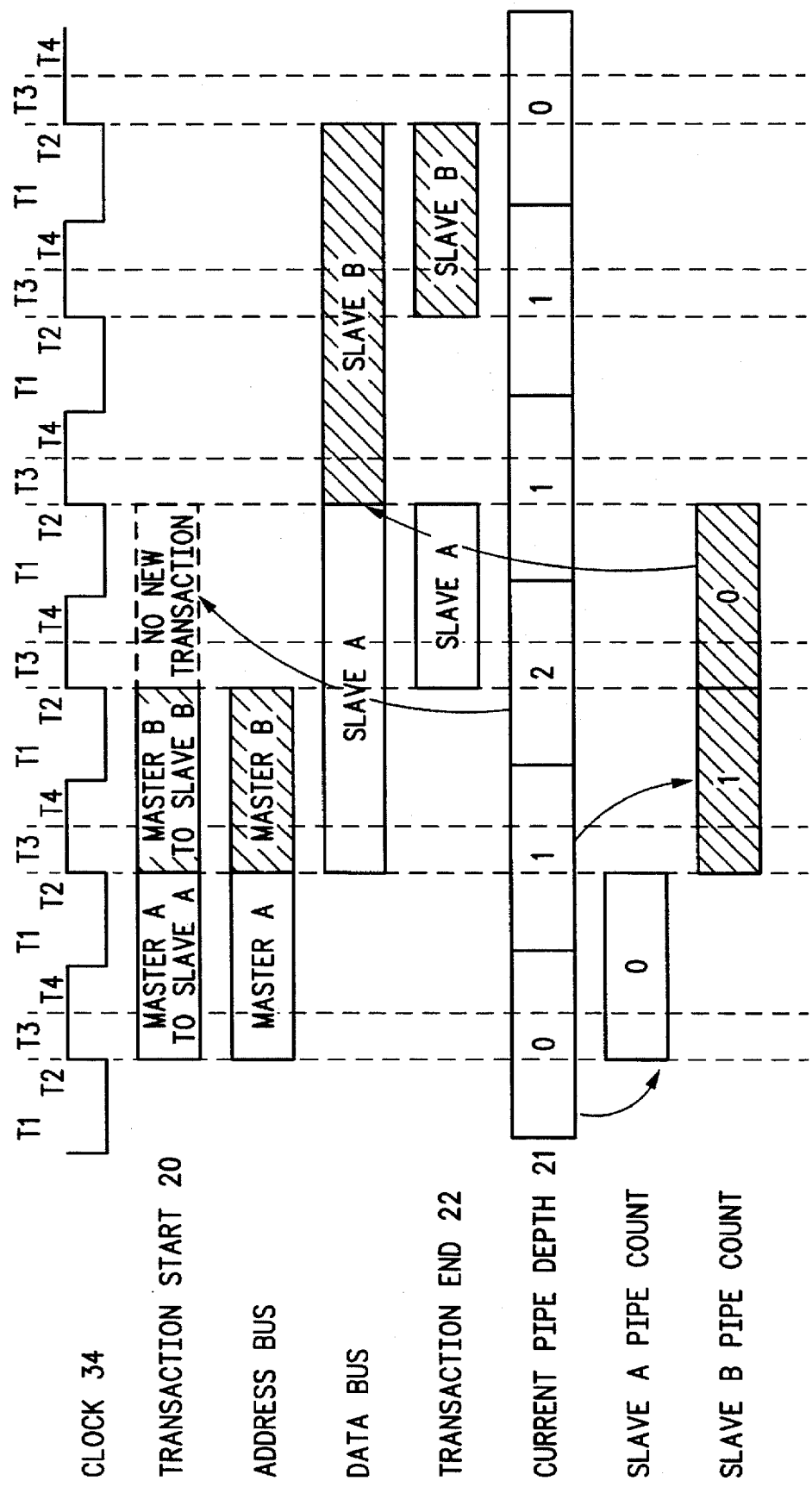
FIG. 2 illustrates, in timing diagram form, a behavior of data processing system 10 of FIG. 1 in accordance with one embodiment of the present invention.

FIG. 2 illustrates, in timing diagram form, a behavior of data processing system 10 of FIG. 1 in accordance with one embodiment of the present invention. In one embodiment of the present invention, clock signal 34 is an internal clock which is used only by bus master 12. In alternate embodiments of the present invention, clock signal 34 is included in bus 18 and is provided to all bus masters 12–13 and all bus slaves 14–15, as well as to central pipe counter 16.

Figure 3:
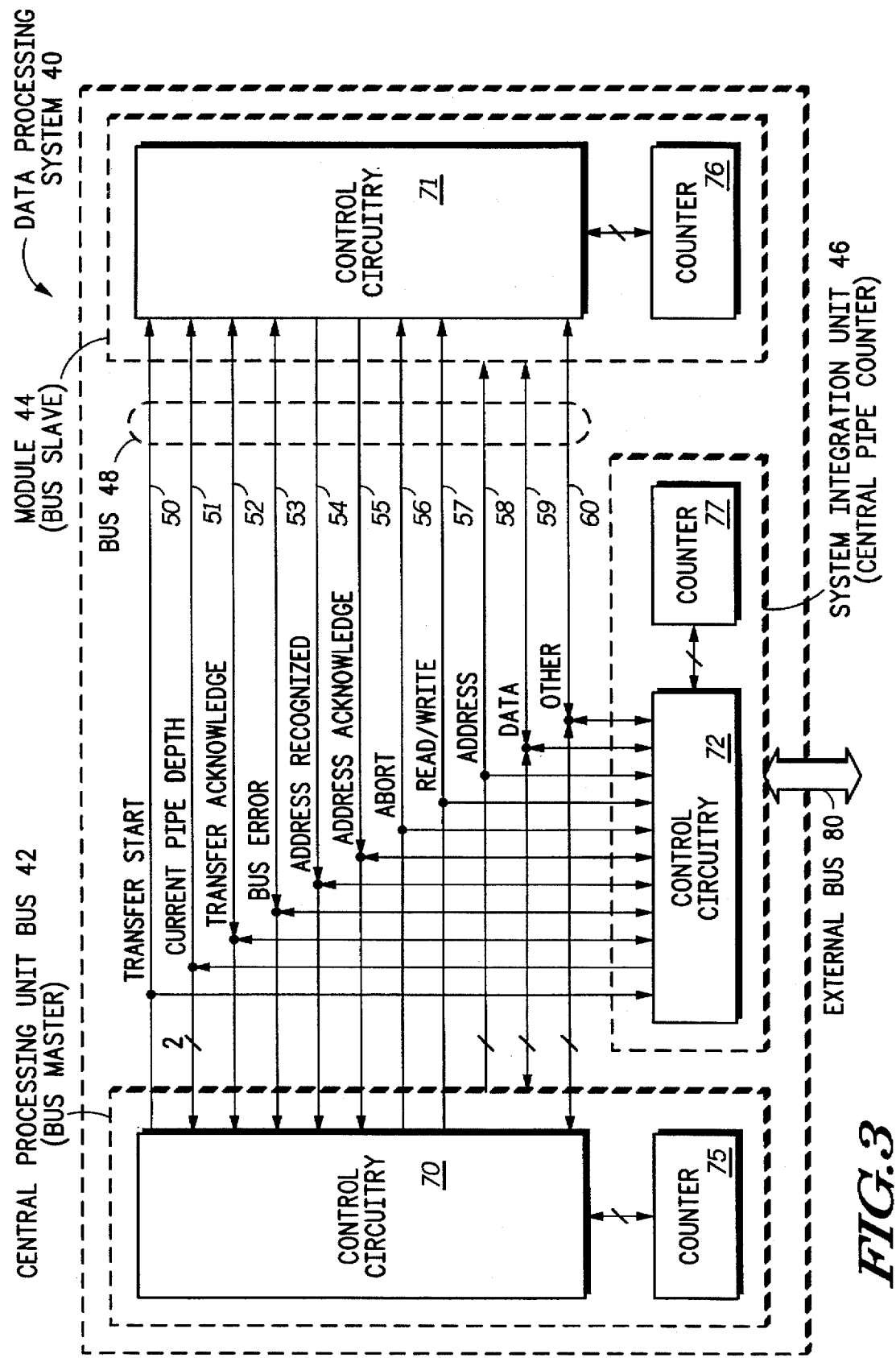
FIG. 3 illustrates, in block diagram form, a data processing system 40 in accordance with an alternate embodiment of the present invention.

FIG. 3 illustrates a data processing system 40 that includes one or more bus master devices 42 and one or more bus slave devices 44 which are bi-directionally coupled by way of bus 48. In one embodiment of the present invention, bus master 42 is a central processing unit (CPU), bus slave 44 is a slave module, and central pipe counter 46 is a system integration unit (SIU). Information is communicated to and from data processing system 40 by way external bus 80. In one embodiment of the present invention, all of data processing system 40 is integrated on a same integrated circuit, and SIU 46 is used to communicate external to the integrated circuit by way of external bus 80. In alternate embodiments of the present invention, various portions of data processing system 40 may be integrated on different integrated circuits.

Bus 48 includes a transfer start signal that is provided by CPU 42 to slave 44 and SIU 46 by way of conductor 50, one or more current pipe depth signals 51 which are provided by SIU 46 to CPU 42 and slave 44 by way of conductors 51, a transfer acknowledge signal that is provided by slave 44 or SILT 46 to CPU 42 and to the other one of slave 44 and SIU 46 by way of conductor 52, a bus error signal that is provided by slave 44 or SIU 46 and is received by the other devices on bus 48 by way of conductor 53, an address recognized signal that is provided by slave 44 or SIU 46 to CPU 42 and SIU 46 by way of conductor 54, and an address acknowledge signal that is provided by slave 44 or SIU 46 to CPU 42 and SIU 46 by way of conductor 55.

Bus 48 also includes an abort signal that is provided by CPU 42 to slave 44 and SUI 46 by way of conductor 56, a read/write signal that is provided by CPU 42 to slave 44 and SIU 46 by way of conductor 57, a plurality of address signals that are provided by CPU 42 to slave 44 and SIU 46 by way of conductors 58, a plurality of data signals that are either provided to CPU 42 from slave 44 or SIU 46 by way of conductors 58 or are provided from CPU 42 to slave 44 or SUI 46 by way of conductors 58, and finally, there are also other signals which are included in bus 18 (e.g. various control signals) that are transferred by way of conductors 60.

CPU 42 includes control circuitry 70 which is bi-directionally coupled to counter 75. Slave 44 includes control circuitry 71 which is bi-directionally coupled to counter 76. SIU 46 includes control circuitry 72 which is bi-directionally coupled to counter 77.

FIG. 4 illustrates, in tabular form, a behavior of data processing system 40 of FIG. 2 in accordance with one embodiment of the present invention.

Figure 5:
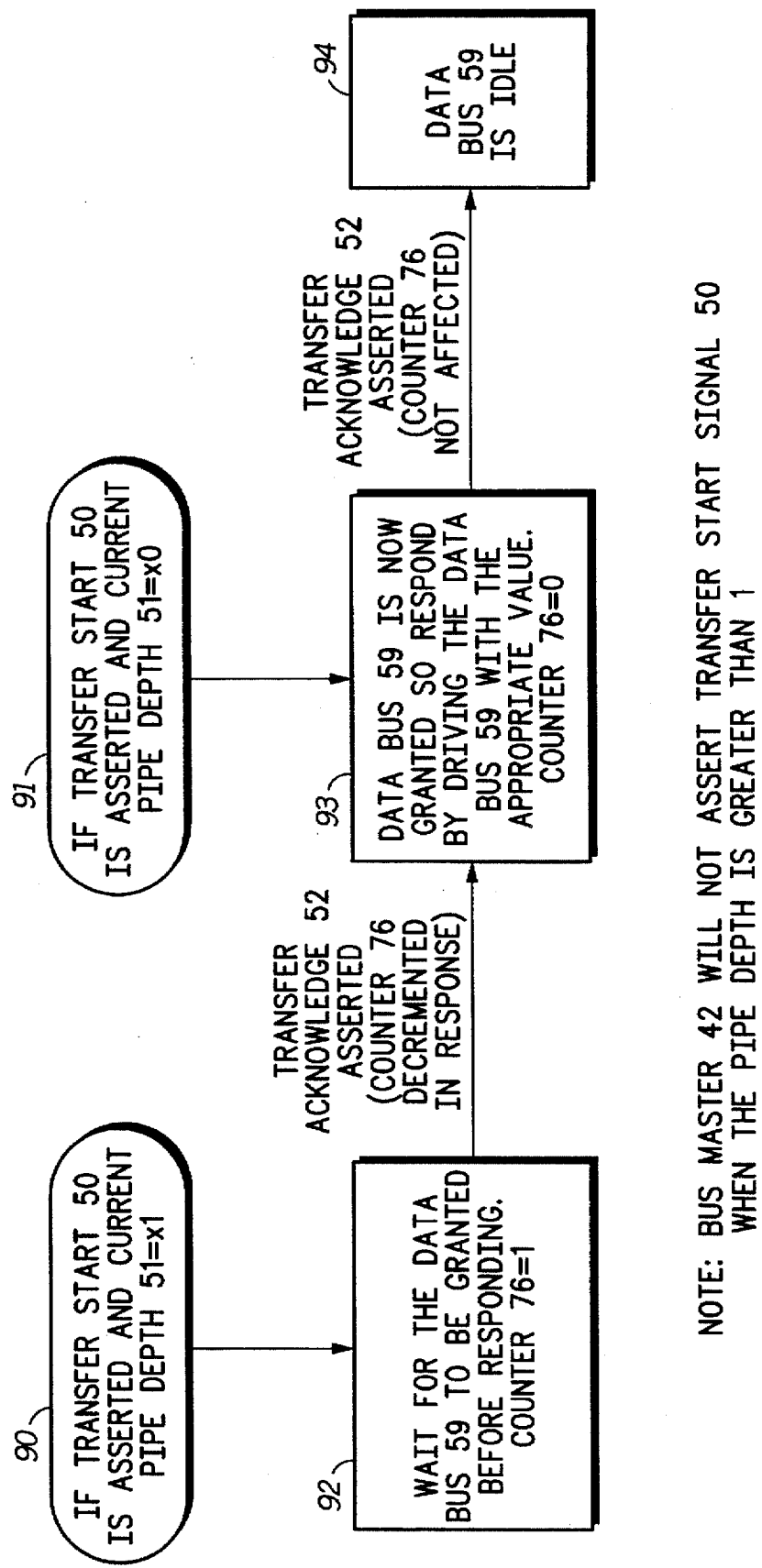
FIG. 5 illustrates, in flow diagram form, a behavior of data processing system 40 of FIG. 3 in accordance with one embodiment of the present, invention.

FIG. 5 illustrates, in flow diagram form, a behavior of data processing system 40 of FIG. 2 in accordance with one embodiment of the present invention. Ovals 90–91 indicate the initiation of a transaction to an address in slave 44 (see FIG. 3). Rectangles 92–94 indicate whether bus slave 44 has ownership of data bus 59.

Figure 6:
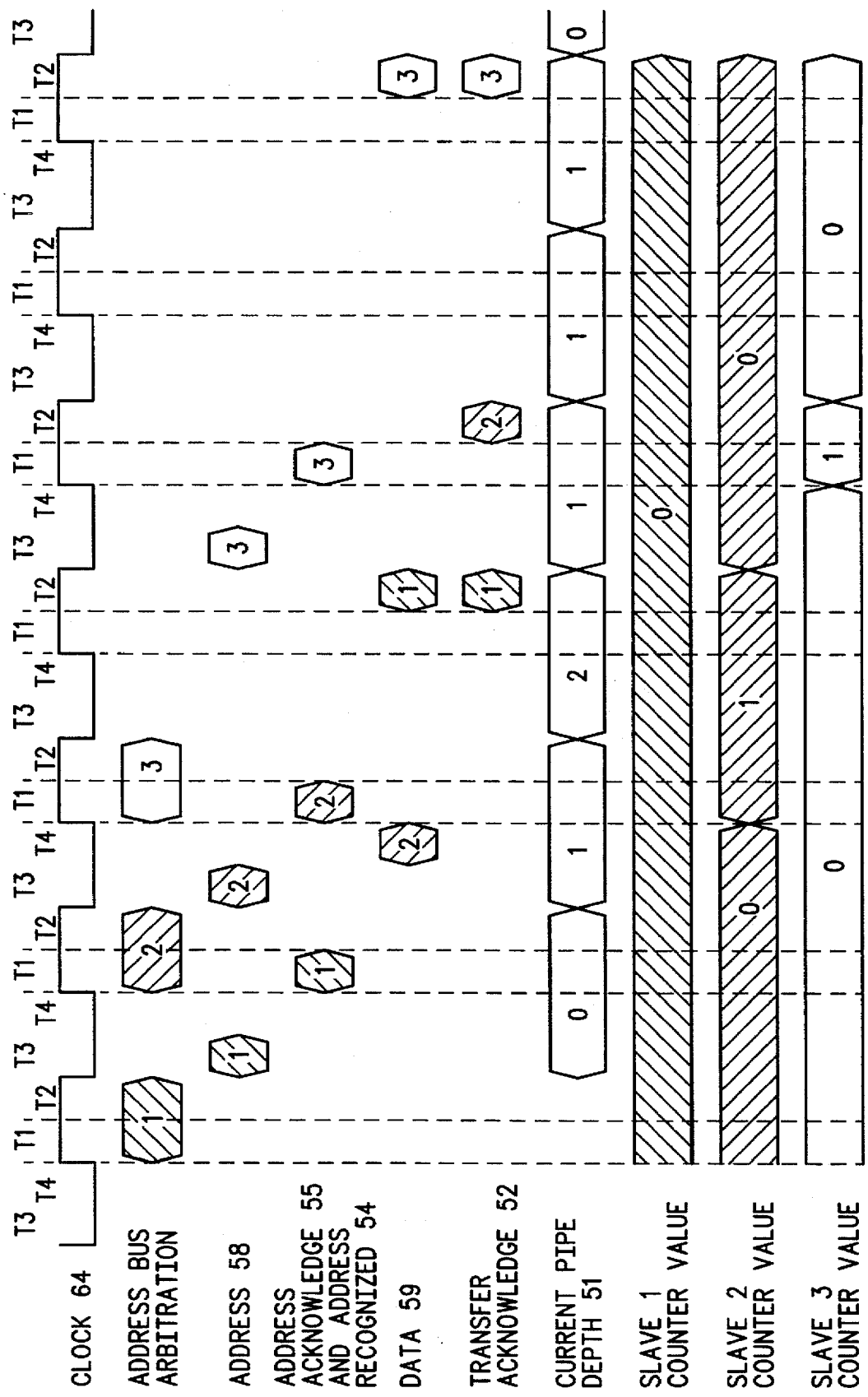
FIG. 6 illustrates, in timing diagram form, a behavior of data processing system 40 of FIG. 3 in accordance with one embodiment of the present invention.

FIG. 6 illustrates, in timing diagram form, a behavior of data processing system 40 of FIG. 2 in accordance with one embodiment of the present invention.

OPERATION OF THE PREFERRED EMBODIMENTS

The operation of the present invention will now be discussed. The present invention solves the problem of matching the initial address request by a bus master to the corresponding data response from a slave when the bus used for master-slave communication is a split-transaction bus and/or a pipelined bus. The present invention provides a method and apparatus for implementing a bus protocol which has in-order termination on the data bus.

Referring to FIG. 1, in one embodiment of the present invention, a central pipe counter 16 is used to track the current pipe depth (i.e. the number of pending transactions). The central pipe counter 16 is incremented each time that a new transaction is started (i.e. the transaction start signal 20 is asserted), and is decremented each time that a transaction is completed or terminated (i.e. the transaction end signal 22 is asserted). Each bus master 12–13 may initiate a new transaction only if the current pipe depth is less than a predetermined maximum pipe depth. For the embodiment of the present invention illustrated in FIG. 2, the maximum pipe depth is 2.

When a new transaction is initiated by a bus master (e.g. 12), the bus slave (e.g. 14) to which the transaction was addressed receives and stores the current pipe depth value into pipe counter 32 from the current pipe depth signals 21. This bus slave 14 then decrements pipe counter 32 each time that a transaction is completed or terminated (i.e. each time that the transaction end signal 22 is asserted). When the bus slave's pipe counter 32 is decremented to "0", the bus slave 14 knows that is will have ownership of the data bus during the next available data phase.

Each time that a bus master (e.g. 12) initiates a transaction, bus master 12 must also track the pipe depth in the same manner as the recipient bus slave (e.g. 14) in order to know when the bus slave's data will be available on the data bus. Therefore, bus master 12, like bus slave 14, must store the current pipe depth value into its pipe counter 30 from the current pipe depth signals 21. Bus master 12 then decrements pipe counter 30 each time that a transaction is completed or terminated (i.e. each time that the transaction end signal 22 is asserted). When the bus master's pipe counter 30 is decremented to "0", the bus master 12 knows that is will be receiving data on the data bus from bus slave 14 during the next available data phase.

Bus masters 12–13 must also monitor the current pipe depth signals 21 to determine if the current pipe depth is less than the predetermined maximum pipe depth. Bus masters 12–13 may not initiate a new transaction if the current pipe depth is at the maximum pipe depth (i.e. if the pipe is full). In some embodiments of the present invention, one or more of bus masters 12–13 may also have circuitry in their pipe counters 30–31 which allows the bus masters 12–13 to anticipate when the pipe depth will reach its maximum pipe depth. The advantage of this approach is that a bus master 12–13 may anticipate that the pipe is not yet full and may therefore initiate a new transaction even before the current pipe depth is available from the central pipe counter 16 on the current pipe depth signals 21. Note that the present invention does not requires any data bus arbitration or grant lines.

Still referring to FIG. 1, data processing system 10 has a central pipe counter 16, one or more bus masters 12–13, and one or more bus slaves 14–15 which are all coupled to bus 18. FIG. 1 illustrates a set of basic control signals that may be included in bus 18 to implement the present invention. Alternate embodiments may use more, fewer, or different signals to implement the present invention. Bus 18 also includes an address bus (not shown separately) and a data bus (not shown separately).

In the embodiment of the present invention illustrated in FIG. 1, a bus master 12–13 initiates a new bus cycle by asserting the transaction start signal 20, and a bus slave 14–15 completes or ends that bus cycle by asserting the transaction end signal 22. Each bus cycle has a corresponding address phase and a corresponding data phase. In the embodiment of the present invention illustrated in FIG. 1, each read bus cycle consists of an address phase in which the bus master 12–13 provides an address value to bus 18, followed by a data phase in which the bus slave 14–15 provides a corresponding data value to bus 18.

Central pipe counter 16 keeps track of the number of pending accesses and provides current pipe depth signals 21 to the bus masters 12–13 and the bus slaves 14–15 in data processing system 10. In the embodiment of the present invention illustrated in FIG. 1, central pipe counter 16 is incremented every time that a transaction start occurs (i.e. every time that the transaction start signal 20 is asserted), and is decremented every time that a transaction end occurs (i.e. every time that the transaction end signal 22 is asserted).

Still referring to FIG. 1, each bus slave 14–15 receives the transaction start signal 20 and the address value from bus master 12–13. Each bus slave 14–15 uses the received address value to determine whether the read bus cycle is attempting to access itself or another bus slave. If a bus slave 14–15 determines that the read bus cycle is not addressing it, it does not respond to the read bus cycle. If a bus slave 14–15 determines that the read bus cycle is addressing it, then bus slave 14–15 must respond by driving the data bus portion of bus 18 during the data phase that corresponds to this particular read bus cycle. Note that bus 18 also includes a read/write signal (not shown separately) which is provided by bus masters 12–13 to indicate to bus slaves 14–15 that the current bus cycle is a read access.

The key problem is how a particular bus slave 14–15 is able to determine which data phase "N" corresponds to the address phase "N" which accessed that particular slave. That is, if during bus cycle N, bus slave 14 receives one of its own address values on the address portion of bus 18, bus slave 14 must determine which time slot on the data portion of bus 18 corresponds to the bus cycle N. Then bus slave 14 must provide the data value to the data portion of bus 18 during the time slot on the data portion of bus 18 which corresponds to the bus cycle N.

In addition, the bus master 12 which initiated bus cycle N must also determine which time slot on the data portion of bus 18 corresponds to the bus cycle N so that bus master 12 can latch the return data provided by bus slave 14. In one embodiment of the present invention, bus master 12 stores a separate pipe depth value for each incomplete transaction which it initiated. This stored pipe depth value is decremented each time that the transaction end signal 22 is asserted. Thus, the same pipe depth value is captured from current pipe depth signals 21 and is stored in both the master's pipe counter 30 and in the slave's pipe counter 32. Both pipe counters 30 and 32 are decremented each time that the transaction end signal 22 is asserted. Note that for a pipe depth of 2, bus master 12 only needs to store one pipe depth value. The one or more stored pipe depth values may be stored in latches (not shown) in pipe counter 30. To complete bus cycle N, bus slave 14 must assert the transaction end signal 22.

The key problem of how a particular bus slave 14–15 is able to determine which data phase "N" belongs to that particular bus slave 14–15 is solved in the following manner. When a new transaction is issued, transaction N+1, a bus slave 14 to which the transaction was issued latches and stores the current pipe depth value from signals 21 into pipe counter 32. Pipe counter 32 may be an up-counter which is incremented until it reaches a predetermined match value or rolls over. Pipe counter 32 may be a down-counter which is loaded with the current pipe depth value and is decremented to a predetermined match value or zero. Or, alternately, pipe counter 32 may be a state machine. The same is true for the implementation of the other pipe counters 30, 31, and 33.

In one embodiment of the present invention, pipe counter 32 is a down-counter which is loaded with the current pipe depth value from signals 21 when an access to bus slave 14 is received. Bus slave 14 then decrements the counter value in pipe counter 32 every time that a transaction is completed (i.e. every time that the transaction end signal 22 is asserted). Thus, when the counter value in pipe counter 32 reaches zero, bus slave 14 determines that the next available data phase is for transaction N+1. So during the next available data phase, bus slave 14 drives its data value onto the data bus portion of bus 18.

Note that the present invention does not require any arbitration for the data bus. Consequently, no data bus arbitration or grant signals are required. Instead, each bus master 12–13 and each bus slave 14–15 has a pipe counter 30–33 to determine when it has ownership of the data bus, while a central pipe counter 16 is used to keep track of the current pipe depth.

FIG. 2 illustrates two pipelined transactions on bus 18 in FIG. 1. Assume that "master-A" (see FIG. 2) is bus master 12 (see FIG. 1), "slave-A" is bus slave 14, "master-B" is bus master 13, and "slave-B" is bus slave 15. The first transaction is from bus master 12 to bus slave 14 (master-A to slave-A), and the second transaction is from bus master 13 to bus slave 15 (master-B to slave-B). Note that clock 34 is used to indicate timing relationships and is used by bus masters 12–13, bus slaves 14–15, and central pipe counter 16. For ease of understanding, each full period of clock 34 is divided into four equal time divisions or ticks which are sequentially labeled T1, T2, T3, and T4. Alternate embodiments of the present invention may use different timing relationships between the various signals on bus 18.

Bus master 12 initiates the first transaction by asserting the transaction start signal 20 and driving the address bus portion of bus 18 with an address value for bus slave 14 on the first T3. As there have been no previous incomplete transactions, the current pipe depth value provided by central pipe counter 16 to signals 21 is zero.

Each bus slave 14–15 responds to the assertion of the transaction start signal 20 by latching the address value and determining whether the address value is one of its own. Since the address value is for bus slave 14, bus slave 14 latches the current pipe depth value from signals 21 ("0" in this case) and stores this value in pipe counter 32. Note that bus master 12 also latches the current pipe depth value from signals 21 ("0" in this case) and stores this value in pipe counter 30. The "slave-A pipe count" value illustrated in FIG. 2 represents the value stored in pipe counter 32.

Since the address value is not for bus slave 15, bus slave 15 does not latch the current pipe depth value from signals 21 and no value is stored in pipe counter 33. The "slave-B pipe count" value illustrated in FIG. 2 represents the value stored in pipe counter 33. Note that in response to the assertion of the transaction start signal 20, the central pipe counter 16 increments its counter and drives the current pipe depth signals 21 with the new current pipe depth value (namely "1").

As the counter value stored in pipe counter 32 is "0", bus slave 14 determines that the next data phase belongs to bus slave 14. Thus, bus slave 14 drives the data bus with its response data value during the next available time slot of the data bus. As the counter value stored in pipe counter 30 is "0", bus master 12 determines that bus slave 14 is responding with its data value during the next available time slot of the data bus.

Bus master 13 initiates the second transaction by asserting the transaction start signal 20 and driving the address bus portion of bus 18 with an address value for bus slave 15 on the second T3. As there is one previous incomplete transaction, the current pipe depth value provided by central pipe counter 16 to signals 21 is "1".

Each bus slave 14-45 responds to the assertion of the transaction start signal 20 by latching the address value and determining whether the address value is one of its own. Since the address value is for bus slave 15, bus slave 15 latches the current pipe depth value from signals 21 ("1" in this case) and stores this value in pipe counter 33. Likewise, bus master 13 latches the current pipe depth value from signals 21 ("1" in this case) and stores this value in pipe counter 31. Since the address value is not for bus slave 14, bus slave 14 does not latch the current pipe depth value from signals 21 and no new value is stored in pipe counter 32; pipe counter 32 still contains a "0". Note that in response to the second assertion of the transaction start signal 20, the central pipe counter 16 increments its counter and drives the current pipe depth signals 21 with the new current pipe depth value (namely "2").

As the counter value stored in pipe counter 33 is "1", bus slave 15 determines that the next data phase does not belong to bus slave 15. Thus, bus slave 15 waits and does not drive the data bus with its response data value. As the counter value stored in pipe counter 31 is "1", bus master 13 determines that bus slave 15 is not responding with its data value during the next available time slot of the data bus.

When bus slave 14 completes the data phase for the first transaction, bus slave 14 asserts the transaction end signal 22. Bus slave 15 and bus master 13 respond to the assertion of the transaction end signal 22 by decrementing the value stored in their respective pipe counters 31 and 33. Likewise, central pipe counter 16 responds to the assertion of the transaction end signal 22 by decrementing its counter and driving the current pipe depth signals 21 with the new current pipe depth value (namely "1").

As the counter value stored in pipe counter 33 has now been decremented to "0", bus slave 15 determines that the next data phase belongs to bus slave 15. Thus, bus slave 15 drives the data bus with its response data value during the next available time slot of the data bus. As the counter value stored in pipe counter 31 is "0", bus master 13 determines that bus slave 15 is responding with its data value during the next available time slot of the data bus.

When bus slave 15 completes the data phase for the second transaction, bus slave 15 asserts the transaction end signal 22. Central pipe counter 16 responds to the assertion of the transaction end signal 22 by decrementing its counter and driving the current pipe depth signals 21 with the new current pipe depth value (namely "0").

Although FIGS. 1 and 2 illustrate a pipe depth of 2, alternate embodiments of the present invention may use any pipe depth. The number of current pipe depth signals 21, the number of bits and latches in pipe counters 30-33, and the number of bits in central pipe counter 16 may be scaled to accommodate any pipe depth.

Note that bus masters 12-13 can use the current pipe depth signals 21 to determine whether or not the maximum pipe depth has been reached, and thus whether or not a new transaction can be started. If the maximum pipe depth has been reached, bus masters 12-13 refrain from initiating a new transaction. If bus masters 12-13 determine from the current pipe depth signals 21 that the maximum pipe depth has been reached, bus masters 12-13 continue to monitor the current pipe depth signals 21 until the central pipe counter 16 decrements the current pipe depth value in response to receiving an asserted transaction end signal 22 from one of the bus slaves 14-15. Once the current pipe depth signals 21 indicate that the pipe depth is no longer at its maximum value, bus masters 12-13 may initiate a new transaction on bus 18.

FIG. 3 illustrates an alternate embodiment of the present invention. The transfer start signal 50 illustrated in FIG. 3 serves the same general purpose as the transaction start signal illustrated in FIG. 1; both signals are asserted by a bus master in order to initiate the address phase of a new transaction. The transfer acknowledge signal 52 illustrated in FIG. 3 serves the same general purpose as the transaction end signal illustrated in FIG. 1; both signals are asserted by a bus slave in order to indicate the completion of the data phase of a transaction. And, the current pipe depth signals 51 illustrated in FIG. 3 serves the same general purpose as the current pipe depth signals illustrated in FIG. 1; both broadcast the current pipe depth to bus master and bus slaves.

Note that in one embodiment of the present invention, the SIU 46 functions as both the central pipe counter and as a bus slave. Alternate embodiments may have the central pipe counter 46 separate from all of the bus slaves. Also, in alternate embodiments of the present invention, instead of having one central pipe counter 46, each bus master (e.g. 42) may keep track of the current pipe depth and may provide the current pipe depth signals 51 for each transaction which that bus master initiates.

In the embodiment of the present invention illustrated in FIG. 3, a bus slave 44 may indicate the completion of the data phase of a transaction by either asserting the transfer acknowledge signal 52 if the transaction has competed without error, or by asserting the bus error signal 53 if the transaction has competed with a bus error. Thus, bus master 42, bus slave 44, and central pipe counter 46 must monitor both the transfer acknowledge signal 52 and the bus error signal 53 in order to properly decrement their respective counters 75-77. Alternate embodiments of the present invention may use any combination of one or more signals to indicate the completion of the data phase of a transaction, as long as the counters 75-76 can be selectively adjusted (i.e. incremented or decremented) based on the one or more signals which indicate that the data phase of a transaction has completed. Note that counters 75-76 may also be implemented as state machines.

In the embodiment of the present invention illustrated in FIG. 3, the address recognized signal 54 and the address acknowledge signal 55 are provided by bus slave 14 to indicate the completion of the address phase of a transaction. Also, the abort signal 56 is provided by bus master 42 in order to abort an address phase of a transaction. Thus, bus master 42, bus slave 44, and central pipe counter 46 must monitor both the transfer start signal 50 and the abort signal 56 in order to properly increment their respective counters 75-77. Alternate embodiments of the present invention may use any combination of one or more signals to indicate that a transaction has been started and will not be aborted before a corresponding data phase is completed.

In the embodiment of the present invention illustrated in FIG. 3, the address bus 58, the data bus 59, and the read/write signal 57 are expressly illustrated. Note that address bus 58 and data bus 59 are pipelined, split transaction buses. Bus 48 also includes other signals 60 which may be used for control or for transferring information, such as, for example, address attribute information (e.g. supervisor/ user space).

FIG. 4 indicates how the pipe depth value in counter 77 is incremented and decremented in one embodiment of the present invention. The column titled "previous pipe depth" indicates the present value stored in counter 77 (see FIG. 3). The column titled "next pipe depth" indicates the next value to be stored in counter 77, as determined by various signals on bus 48. In the embodiment of the present invention illustrated in FIG. 4, the next pipe depth is a function of the transfer start signal 50, the address acknowledge signal 55, the abort signal 56, and the transfer acknowledge signal 52.

Note that in some embodiments of the present invention, the next pipe depth is also a function of the bus error signal 53 which may be used in the same manner as the transfer acknowledge signal 52 to indicate the completion of the data phase of a transaction. Alternate embodiments of the present invention may not use a bus error signal 53, or may not use the bus error signal 53 in this manner.

The column titled "start a new cycle on T3?" indicates whether or not the maximum pipe depth has been reached, and thus whether a bus master 42 can initiate a new transaction or bus cycle on bus 48. Since the maximum pipe depth for the data processing system 40 illustrated in FIG. 3 is 2, bus master 42 does not initiate a new transaction when the next pipe depth value will be "2".

Note that in some embodiments of the present invention, the control circuitry 70 in bus master 42 may duplicate most or all of the control circuitry 72 in the central pipe counter 46 so that bus master 42 may effectively anticipate when the maximum pipe depth will be reached. Thus if the timing of bus 48 requires that bus master 42 determine whether or not to initiate a new transaction before the next pipe depth value has been received by way of signals 51, bus master 42 may effectively anticipate when the maximum pipe depth will be reached by calculating the next pipe value in the same manner as central pipe counter 46 (see table in FIG. 4). In alternate embodiments of the present invention, bus master 42 has a more simple counter 75 and must wait for the next pipe depth value to be provided from central pipe counter 46 by way of the current pipe depth signals 51.

FIG. 5 illustrates a flow diagram of the behavior of bus slave 44, assuming that bus slave 44 is available to respond to the transaction and the transaction is not aborted. Referring to oval 90, if the transfer start signal 50 is asserted and the current pipe depth signals 51 are binary "x1", bus slave 44 will wait for the data bus 59 to be granted before responding (see rectangle 92). Note that counter 76 stores the least significant bit of the current pipe depth signals 51. Thus, counter 76 stores a "1". If the transfer acknowledge signal 52 is asserted, counter 76 is decremented so that it now contains "0", thus indicating that the data bus 59 has been granted and bus slave 44 may respond by driving the data bus 59 with the appropriate data value (see rectangle 93). The transfer acknowledge signal 52 is then asserted by bus slave 44, counter 76 is not affected (it continues to store a "0"), and the data bus 59 is now idle as no other transactions are pending (see rectangle 94).

Referring to oval 91, if the transfer start signal 50 is asserted and the current pipe depth signals 51 are binary "x0", bus slave 44 determines that data bus 59 has been granted, and bus slave 44 responds by driving the data bus 59 with the appropriate data value (see rectangle 93). The transfer acknowledge signal 52 is then asserted by bus slave 44, counter 76 is not affected (it continues to store a "0"), and the data bus 59 is now idle as no other transactions are pending (see rectangle 94).

FIG. 6 illustrates three pipelined transactions on bus 48 (see FIG. 3). The first transaction is a read access to a first bus slave (e.g. bus slave 14), the second transaction is a write access to a second bus slave, and the third transaction is a read access to a third bus slave. Note that clock 64 is used to indicate timing relationships and is used by bus master 12, bus slave 14, and central pipe counter 46. For ease of understanding, each full period of clock 34 is divided into four equal time divisions or ticks which are sequentially labeled T1, T2, T3, and T4. Alternate embodiments of the present invention may use different timing relationships between the various signals on bus 48. Note that any type of address bus arbitration for ownership of address signals 58 may be used.

Referring to FIG. 6, note that for write accesses, the bus master 42 drives the data bus 59 with the data value during T4, and for read accesses, the bus slave 44 drives the data bus 59 with the data value during T2. However, because data bus 59 is an in-order termination bus, each bus slave must keep track of whether it has ownership of data bus 59 so that it may properly terminate the data phase of a transaction by asserting the transfer acknowledge signal 52 at the proper time. Thus even though the second slave is being accessed for a write access and latches the data value from data bus 59 during T4, the second slave must latch the current pipe depth value from signals 51 in order to determine when it should assert the transfer acknowledge signal 52.

If the second slave did not properly terminate the data phase of the second transaction by asserting the transfer acknowledge signal 52, there would not be a corresponding assertion of the transfer acknowledge signal 52 for every assertion of the transfer start signal 50. And as a consequence, the termination of the data phases on data bus 59 would no longer be in order and bus master 42 and the other bus slaves 44 would lose track of which device currently has ownership of data bus 59.

Note that in an alternate embodiment of the present invention, the incrementing and decrementing of counters 75–77 can be qualified by the read/write signal so that counters 75–77 ignore all write access and data bus ownership during read accesses is determined independent of all write accesses. The data bus ownership during write accesses is given to the bus master that initiated the most recent transaction, and write accesses on the data bus uses time slots that do not conflict with read accesses on the data bus (e.g. write accesses use time slots T3 and T4 of the data bus, while read access use time slots T1 and T2 of the data bus).

Although FIGS. 3–6 illustrate a pipe depth of 2, alternate embodiments of the present invention may use any pipe depth. The number of current pipe depth signals 51 and the number of bits and latches in counters 75–77 may be scaled to accommodate any pipe depth.

It will be appreciated that although only certain embodiments of the invention have been described in detail, various modifications and improvements can be made by a person skilled in the art without departing from the scope of the present invention. It is to be understood, therefore, that this invention is not limited to the particular forms illustrated and that the appended claims cover all modifications that do not depart from the spirit and scope of this invention.

We claim:

1. A data processing system, comprising:
   a bus, comprising
      a bus transaction start conductor for transferring a bus transaction start signal representing a request to start a transaction,
      a bus transaction end conductor for transferring a bus transaction end signal representing a request to complete a transaction, and
      at least one pipe depth conductor for transferring a pipe depth value;
   a bus master, coupled to said bus, said bus master providing the bus transaction start signal to said bus;
   a bus slave, coupled to said bus, said bus slave providing the bus transaction end signal to said bus; and
   a first counter, coupled to said bus, said first counter storing a first count value, the first count value being adjusted based upon both the bus transaction start signal and the bus transaction end signal, said first counter providing the first count value to said at least one pipe depth conductor as the pipe depth value.

2. A data processing system as in claim 1, wherein said bus slave comprises:
   a second counter for receiving and storing the pipe depth value from said at least one pipe depth conductor during a first bus transaction which is addressed to said bus slave, said second counter adjusting the pipe depth value stored in said second counter based upon the bus transaction end signal.

3. A data processing system as in claim 2, wherein said bus slave uses the pipe depth value stored in said second counter to determine whether said bus slave has ownership of a data portion of said bus after initiation of the first bus transaction.

4. A data processing system as in claim 3, wherein after initiation of the first bus transaction, said bus slave has ownership of the data portion of said bus when the pipe depth value stored in said second counter is equal to zero, and wherein said bus slave does not have ownership of the data portion of said bus when the pipe depth value stored in said second counter is not equal to zero.

5. A data processing system as in claim 3, wherein after initiation of the first bus transaction, the pipe depth value stored in said second counter is not equal to zero, the pipe depth value stored in said second counter is decremented by assertion of the bus transaction end signal.

6. A data processing system as in claim 1, wherein said data processing system further comprises:
   a second bus slave, coupled to said bus;
   wherein said bus slave comprises:
      a second counter for receiving and storing the pipe depth value from said at least one pipe depth conductor during a first bus transaction which is addressed to said bus slave;
   wherein said second bus slave comprises:
      a third counter for receiving and storing the pipe depth value from said at least one pipe depth conductor during a second bus transaction which is addressed to said second bus slave; and
   wherein said bus further comprises:
      a plurality of address conductors for transferring an address value; and
      a plurality of data conductors for transferring a data value.

7. A data processing system as in claim 1, wherein said bus master comprises:
   a second counter for storing a second count value, the second count value being adjusted based upon both the bus transaction start signal and the bus transaction end signal, said bus master using the second count value to determine whether to initiate a new bus transaction.

8. A data processing system as in claim 1, wherein a maximum value for the pipe depth value is two.

9. A data processing system as in claim 1, wherein said bus further comprises:
   an address bus; and
   a data bus;
   wherein said address bus and said data bus are pipelined and split-transaction, and wherein said data bus uses in-order termination.

10. A method for implementing a bus protocol having in-order termination in a data processing system, the data processing system having a bus master coupled to a bus slave by way of a bus, the method comprising the steps of:
    asserting a transaction start signal to begin a first bus transaction;
    providing a pipe depth value to the bus slave by way of the bus during the first bus transaction;
    storing the pipe depth value as a first transaction pipe depth value in the bus slave;
    if the first transaction pipe depth value is a predetermined value, granting ownership of the bus to the bus slave and providing a first data value from the bus slave to the bus;
    if the first transaction pipe depth value is not the predetermined value, withholding granting ownership of the bus to the bus slave;
    asserting the transaction start signal to begin a second bus transaction;
    in response to said step of asserting the transaction start signal to begin a second bus transaction, performing one of an incrementing operation and a decrementing operation on the first transaction pipe depth value stored in the bus slave to produce an adjusted first transaction pipe depth value;
    if the adjusted first transaction pipe depth value is a predetermined value, granting ownership of the bus to the bus slave and providing the first data value from the bus slave to the bus; and
    if the adjusted first transaction pipe depth value is not the predetermined value, withholding granting ownership of the bus to the bus slave.

11. A method as in claim 10, further comprising a step of:
    in response to said step of asserting the transaction start signal to begin the first bus transaction, performing one of the incrementing operation and the decrementing operation on the pipe depth value stored in a counter.

12. A method as in claim 11, further comprising a step of:
    in response to said step of asserting the transaction start signal to begin the second bus transaction, performing one of the incrementing operation and the decrementing operation on the pipe depth value stored in the counter.

13. A method as in claim 10, further comprising steps of:
    asserting a transaction end signal to end the first bus transaction; and
    in response to said step of asserting the transaction end signal to end the first bus transaction, performing an opposite one of the incrementing operation and the decrementing operation on the pipe depth value stored in the counter.

14. A method as in claim 13, further comprising steps of:

asserting the transaction end signal to end the second bus transaction; and in response to said step of asserting the transaction end signal to end the second bus transaction, performing the opposite one of the incrementing operation and the decrementing operation on the pipe depth value stored in the counter.

15. A data processing system, comprising:

a bus, comprising
   a bus transaction start conductor for transferring a bus transaction start signal,
   a bus transaction end conductor for transferring a bus transaction end signal,
   at least one pipe depth conductor for transferring a pipe depth value,
   an address bus, and
   a data bus;

a bus master, coupled to said bus, said bus master providing the bus transaction start signal to said bus;

a first bus slave, coupled to said bus, said first bus slave providing the bus transaction end signal to said bus; and a second bus slave, coupled to said bus, said second bus slave providing the bus transaction end signal to said bus;

wherein said first bus slave comprises:
   a first counter for determining the pipe depth value, the pipe depth value being incremented in response to assertion of the bus transaction start signal, the pipe depth value being decremented in response to assertion of the bus transaction end signal; and wherein said second bus slave comprises:
   a second counter for receiving the pipe depth value from said first counter and for calculating when said second bus slave has ownership of said data bus.

* * * * *